(12) United States Patent
Feng

(10) Patent No.: US 9,245,505 B1
(45) Date of Patent: Jan. 26, 2016

(54) ELECTRIC GUITAR

(71) Applicant: Shan Feng, Guangzhou (CN)

(72) Inventor: Shan Feng, Guangzhou (CN)

( * ) Notice: Subject to any disclaimer, the term of this patent is extended or adjusted under 35 U.S.C. 154(b) by 0 days.

(21) Appl. No.: 14/580,254

(22) Filed: Dec. 23, 2014

(30) Foreign Application Priority Data

Nov. 28, 2014 (CN) .......................... 2014 1 0715463

(51) Int. Cl.
*G10H 1/02* (2006.01)
*G10C 3/12* (2006.01)
*G06F 3/0488* (2013.01)
*G10H 3/18* (2006.01)

(52) U.S. Cl.
CPC .............. *G10H 1/02* (2013.01); *G06F 3/04886* (2013.01); *G10C 3/12* (2013.01); *G10H 3/18* (2013.01)

(58) Field of Classification Search
CPC ............. G10H 1/02; G10H 3/18; G10C 3/12; G06F 3/04886
USPC .......................................................... 84/737
See application file for complete search history.

(56) References Cited

U.S. PATENT DOCUMENTS

| 4,481,854 | A | * | 11/1984 | Dugas | 84/736 |
|---|---|---|---|---|---|
| 5,025,703 | A | * | 6/1991 | Iba et al. | 84/718 |
| 6,111,179 | A | * | 8/2000 | Miller | 84/442 |
| 6,191,348 | B1 | * | 2/2001 | Johnson | 84/485 R |
| 7,208,673 | B2 | * | 4/2007 | Bryce | 84/742 |
| 7,304,232 | B1 | * | 12/2007 | Nicholes | 84/741 |
| 7,435,178 | B1 | * | 10/2008 | Tam et al. | 463/38 |
| 8,003,872 | B2 | * | 8/2011 | Lopiccolo et al. | 84/609 |
| 9,117,431 | B1 | * | 8/2015 | Rudes | |
| 2005/0183566 | A1 | * | 8/2005 | Nash | 84/601 |
| 2008/0156180 | A1 | * | 7/2008 | Bagale | 84/743 |
| 2011/0005367 | A1 | * | 1/2011 | Hwang et al. | 84/314 R |
| 2011/0088535 | A1 | * | 4/2011 | Zarimis | 84/645 |
| 2011/0283868 | A1 | * | 11/2011 | Behringer et al. | 84/622 |
| 2012/0174736 | A1 | * | 7/2012 | Wang et al. | 84/622 |
| 2012/0297962 | A1 | * | 11/2012 | O'Donnell et al. | 84/645 |
| 2012/0318121 | A1 | * | 12/2012 | Mittelstadt et al. | 84/743 |
| 2013/0174717 | A1 | * | 7/2013 | Butera et al. | 84/609 |
| 2013/0255474 | A1 | * | 10/2013 | Hanks | 84/615 |

FOREIGN PATENT DOCUMENTS

CN 104091589 A 10/2014

\* cited by examiner

*Primary Examiner* — Jeffrey Donels

(57) ABSTRACT

An electric guitar includes a neck and a body connected with the neck. The neck includes a mounting plate, a plurality of touch keys and a display screen. The touch keys and the display screen are mounted on the mounting plate. The touch keys are positioned at an upper edge or lower edge of the display screen. The body includes an outer shell, a human-machine interface, a control circuit board, a speaker and a power source. The human-machine interface is mounted on an upper surface of the outer shell. The control circuit board, the speaker and the power source are mounted in the outer shell; the touch keys, the display screen, the speaker and the human-machine interface are electrically connected with the control circuit board. The mounting plate is positioned at a right side surface of the outer shell.

10 Claims, 4 Drawing Sheets

ELECTRIC GUITAR

CROSS-REFERENCE TO RELATED APPLICATIONS

This present application claims the benefit of Chinese Patent Application No. 201410715463.6 filed on Nov. 28, 2014, the contents of which are hereby incorporated by reference.

TECHNICAL FIELD

The present invention relates to an electric guitar.

BACKGROUND

To play electric guitar well, one needs to be familiar with the music, and master the finger positions after lots of long-term training. In other words, a beginner needs to learn and practice for a long time to plays a graceful flowing music using the electric guitar. The electric guitar by which the beginner can play graceful flowing music without a good understanding of music and without any finger position training has not been available so far.

SUMMARY OF THE INVENTION

To overcome the defects described above, the present invention provides an electric guitar by which the beginner can play music gracefully and easily without training.

Some embodiments of the present invention refer to:

An electric guitar, comprising:

a neck and a body connected with the neck; wherein the neck includes a mounting plate, a plurality of touch keys and a display screen for guiding a user to press corresponding touch keys; the touch keys and the display screen are mounted on the mounting plate; the touch keys are positioned at an upper edge or lower edge of the display screen; the body includes an outer shell, a human-machine interface, a control circuit board, a speaker and a power source; the human-machine interface is mounted on an upper surface of the outer shell; the control circuit board, the speaker and the power source are mounted in the outer shell; the touch keys, the display screen, the speaker and the human-machine interface are electrically connected with the control circuit board; the power source is configured for powering the speaker, the touch keys, the display screen, the human-machine interface and the control circuit board; the mounting plate is positioned at a right side surface of the outer shell; the display screen leans at an inclined angle towards a front surface of the outer shell; and the inclined angle is between 10 degree and 160 degree.

Preferably, the front surface of the outer shell has a joystick for selecting sound effects; and the joystick is electrically connected with the control circuit board.

Preferably, the front surface of the outer shell has a group of buttons for selecting sound effects; and the button group is electrically connected with the circuit board.

Preferably, a left side surface of the outer shell has a protruding handle; the handle has a group of buttons for selecting sound effects; and the button group is connected with the control circuit board.

Preferably, a right side surface of the outer shell has a mounting groove; the mounting plate extends towards the right side surface to form a mounting member; the mounting member extends into an inner space of the outer shell through the mounting groove; and the mounting member is attached to the outer shell by screws.

Preferably, a back surface of the outer shell has a first opening corresponding to the mounting member; and the first opening is sealed with a first cover; The first cover is attached to the first opening by snap joint.

Preferably, a back surface of the outer shell has a second opening sealed with a second cover; the second cover is attached to the second opening by snap joint; the power source is fixed on the second cover.

Preferably, the power source is a portable power source.

Preferably, the control circuit board has a main CPU (central processing unit) module, a data storage device, an audio circuit and a sound amplifier; the data storage device, the audio circuit, the sound amplifier, the touch keys, the display screen and the human-machine interface are electrically connected with the main CPU module; and the sound amplifier is connected with the speaker.

Preferably, the display screen is a LED (light emitting diode) display screen or a LCD (liquid crystal display).

Beneficial effects of the present invention are as follows:

The user can easily play guitar music by pressing the touch keys corresponding to the instructions on the display screen.

DETAILED DESCRIPTION OF THE PREFERRED EMBODIMENTS

Figure 1:
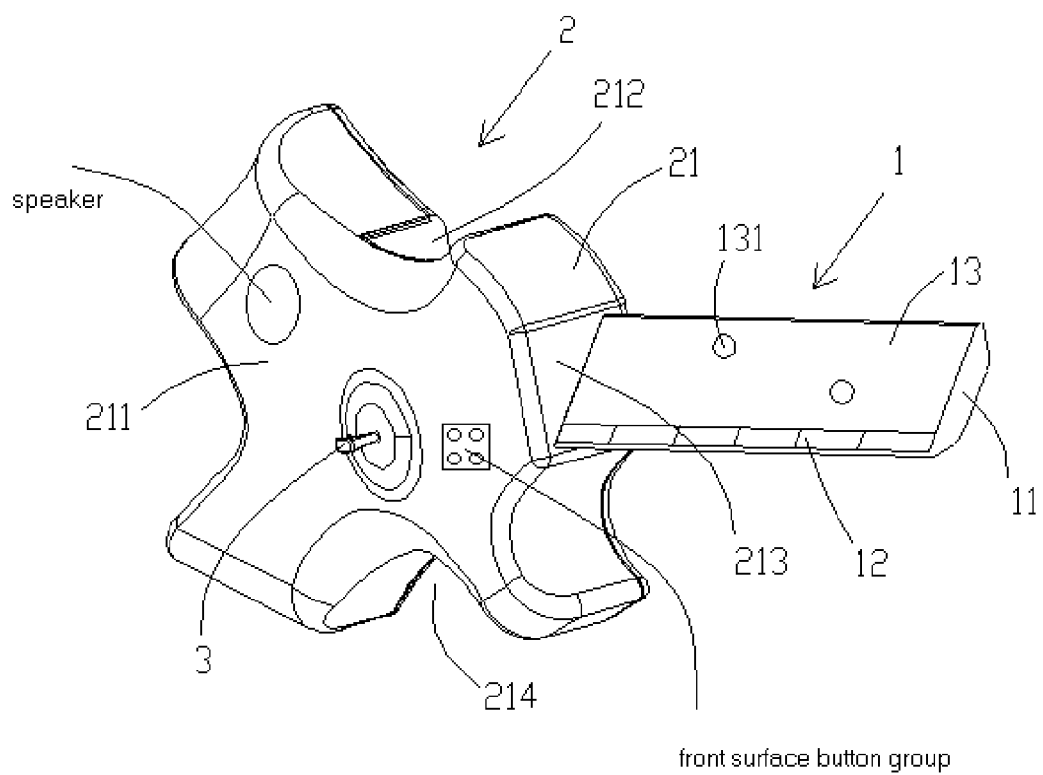
FIG. 1 is a schematic diagram of a first embodiment of a front view of an electric guitar.
Figure 2:
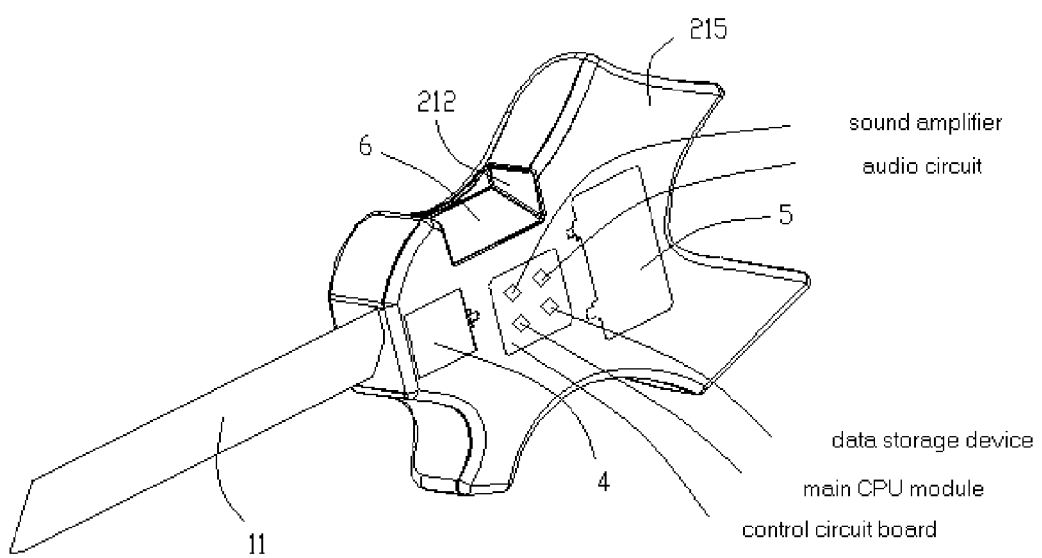
FIG. 2 is a schematic diagram of a back view of the electric guitar of FIG. 1.
Figure 3:
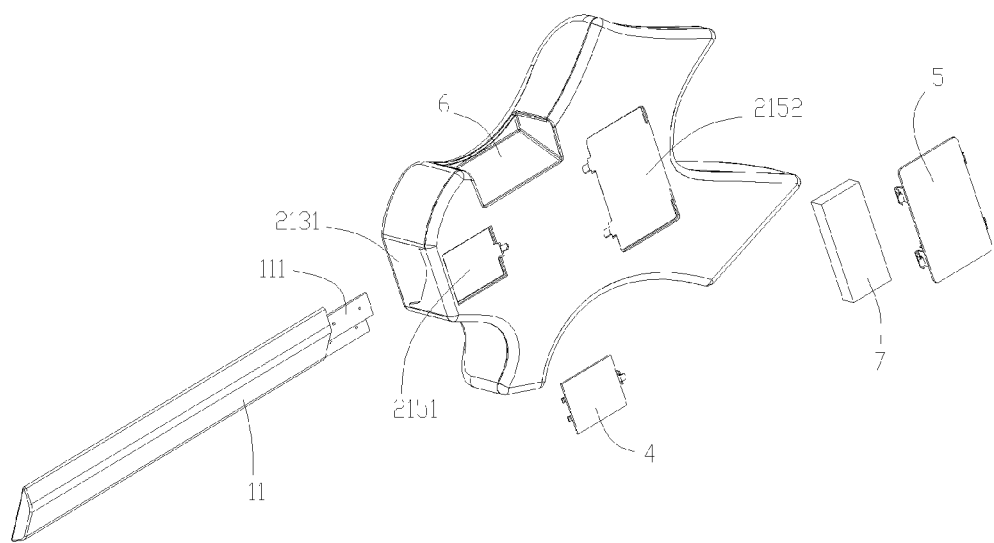
FIG. 3 is a schematic diagram of an exploded view of the electric guitar of FIG. 1.

Referring to the FIG. 1 to FIG. 3, a first embodiment of an electric guitar includes a neck 1 and a body 2 connected with the neck 1.

The neck 1 includes a mounting plate 11, a plurality of touch keys 12 and a display screen 13 for guiding a user to press corresponding touch keys 12. The touch keys 12 and the display screen 13 are mounted on the mounting plate 11. The touch keys 12 are positioned at a lower edge of the display screen 13. In this embodiment, the display screen 13 may be a LED (light emitting diode) display screen or a LCD (liquid crystal display). The touch keys 12 are arranged along a length direction of the display screen 13. The display screen 13 has lines of timed descending instructions 131 for guiding the user to press the corresponding touch keys 12. Each line of instruction is corresponding in position with one of the touch keys 12. When the display screen 13 is the LED display screen, a vertical line of LED lights are used for displaying one instruction 131 corresponding in position with one of the touch keys 12. The touch keys may be combined to constitute a strip of a touch screen.

The body 2 includes an outer shell 21, a human-machine interface 6, a control circuit board, a speaker and a power source. The human-machine interface 6 is mounted on an upper surface of the outer shell 21. Specifically, the outer shell 21 has a groove 212 at the upper surface thereof. The human-machine interface 6 is mounted in the groove 212. In order that the user can watch easily, the human-machine interface 6 leans at a 45 degree angle relative to a back surface of the outer shell 21. In fact, the angle may change between 10 degree and 165 degree. The human-machine interface 6 may be a touch screen. A front surface of the outer shell 21 has a joystick 3 for selecting sound effects, and the joystick 3 is electrically connected with the control circuit board.

The control circuit board, the speaker and the power source 7 are mounted in the outer shell 21. The control circuit board has a main CPU (central processing unit) module, a data storage device, an audio circuit and a sound amplifier. The data storage device, the audio circuit, the sound amplifier, the touch keys 12, the display screen 13, the joystick and the human-machine interface 6 are connected with the main CPU module, and the sound amplifier is connected with the speaker. The touch key 12 and the display screen 13 may be respectively connected with corresponding connection terminals of the control circuit board via their connection terminals.

The power source 7 is configured for powering the speaker, the touch keys 12, the display screen 13, the human-machine interface 6 and the control circuit board.

The mounting plate 11 is positioned at a right side surface 213 of the outer shell 21. The display screen 13 leans at an inclined angle towards the front surface 211 of the outer shell 21. The inclined angle may be between 10 degree and 160 degree. In this embodiment, the inclined angle is 45 degree.

For ease of packaging and carrying, the neck 1 is removable attached to the body 2. Specifically, the right side surface 213 of the outer shell 21 has a mounting groove 2123. The mounting plate 11 extends towards the right side surface 213 to form a mounting member 111. The mounting member 11 extends into an inner space of the outer shell 21 through the mounting groove 2123. The mounting member 111 is attached to the outer shell 21 by screws. In order to assemble the neck 1 easily, the back surface 215 has a first opening 2151 corresponding to the mounting member 111. The first opening 2151 is sealed with a first cover 4. The first cover 4 is attached to the first opening 2125 by snap joint.

In order to remove the power source 7, the back surface 215 of the outer shell 21 has a second opening 2152 sealed with a second cover 5. The second cover 5 is attached to the second opening 2152 by snap joint. The power source 7 is fixed on the second cover 5. In this embodiment, the power source 7 may be a portable power source. The power source 7 may be connected with the control circuit board via a USB (Universal Serial Bus) port.

For ease of use, a bottom surface of the outer shell 21 has a concavity 214 for sitting on the thigh of the user.

In use, the electric guitar is positioned on the thigh of the user via the concavity 214. The user can select a song via the human-machine interface 6, then look at the instructions 131 on the display screen 13, and press touch keys 12 corresponding the instructions 131. The control circuit would drive the speaker to make a guitar sound based on a signal transmitted from the touch keys 12. The user may push the joystick 3 upward, downward, leftward or rightward, so that the speaker makes a sound effect, such as tremolo sound, distortion sound, sweep sound, mixing with the guitar sound. In this embodiment, the method of making sounds are the same as the one described in the Chinese invention patent application (CN201410312842.0), which is incorporated by reference and discloses a bowstring instrument play instruction apparatus. As is described in the Chinese invention patent application, the main CPU module reads a MIDI file from the data storage device to produce the instructions on the LED display screen; the user presses the touch keys 12 according to the corresponding instructions displayed on the LED display screen; based on the signal outputted by the touch keys 12, the main CPU module drives the speaker to make sounds via the audio circuit and the sound amplifier.

Moreover, the joystick 3 may be replaced by, or work together with buttons. For example, the front surface of the outer shell has a group of buttons for selecting sound effects. The button group is electrically connected with the circuit board.

Figure 4:
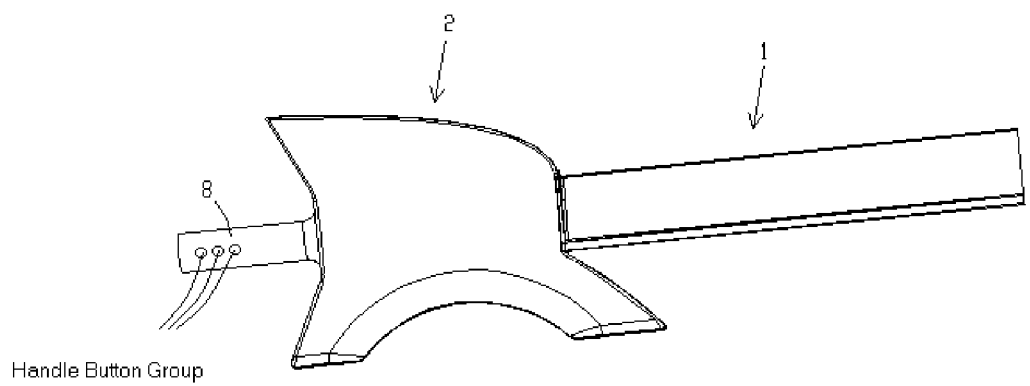
FIG. 4 is a schematic diagram of a second embodiment of the electric guitar.

In a second embodiment, as shown in FIG. 4, the left side surface of the outer shell of the body has a protruding handle 8 instead of the joystick or button group described in the first embodiment. The handle 8 has a group of buttons for selecting sound effects. The button group is connected with the control circuit board. The neck 1 is positioned at the right of the body 2. In use, the user holds the handle 8, and presses the button group, to make a specific sound effect.

As for play method, the present invention is totally different from a conventional electric guitar. When playing the conventional electric guitar, the user needs to distinguish between the six guitar strings, press the correct position on the strings by his/her left hand, and play the string by his/her right hand to make a sound. In the present invention, the user plays the guitar by looking at the signal on the display screen and pressing on the one single line of touch keys corresponding to the signal position of the display screen to play a guitar song.

Various modifications could be made to the embodiments by those of ordinary skill in the art without departing from the true spirit and scope of the disclosure. And those modified embodiments are covered by the claims of the disclosure.

What is claimed is:

1. An electric guitar, comprising:
a neck and a body connected with the neck; wherein
the neck includes a mounting plate, a plurality of touch keys and a display screen for guiding a user to press corresponding touch keys; the touch keys and the display screen are mounted on the mounting plate; the touch keys are positioned at an upper edge or lower edge of the display screen; the body includes an outer shell, a touch screen, a control circuit board, a speaker and a power source; the touch screen is mounted on an upper surface of the outer shell; the control circuit board, the speaker and the power source are mounted in the outer shell; the touch keys, the display screen, the speaker and the touch screen are electrically connected with the control circuit board; the power source is configured for powering the speaker, the touch keys, the display screen, the touch screen and the control circuit board; the mounting plate is positioned at a right side surface of the outer shell; the display screen leans at an inclined angle towards a front surface of the outer shell; and the inclined angle is between 10 degree and 160 degree.

2. The electric guitar of claim 1, wherein the front surface of the outer shell has a joystick for selecting sound effects; and the joystick is electrically connected with the control circuit board.

3. The electric guitar of claim 1, wherein a front surface of the outer shell has a group of buttons for selecting sound effects; and the button group is electrically connected with the circuit board.

4. The electric guitar of claim 1, wherein a left side surface of the outer shell has a protruding handle; the handle has a group of buttons for selecting sound effects; and the button group is connected with the control circuit board.

5. The electric guitar of claim 1, wherein a right side surface of the outer shell has a mounting groove; the mounting plate extends towards the right side surface to form a mounting member; the mounting member extends into an inner space of the outer shell through the mounting groove; and the mounting member is attached to the outer shell by screw.

6. The electric guitar of claim 5, wherein a back surface of the outer shell has a first opening corresponding to the mounting member; and the first opening is sealed with a first cover; and the first cover is attached to the first opening by snap joint.

7. The electric guitar of claim 1, wherein a back surface of the outer shell has a second opening sealed with a second cover; the second cover is attached to the second opening by snap joint; and the power source is fixed on the second cover.

8. The electric guitar of claim 7, wherein the power source is a portable power source.

9. The electric guitar of claim 1, wherein the control circuit board has a main CPU (central processing unit) module, a data storage device, an audio circuit and a sound amplifier; the data storage device, the audio circuit, the sound amplifier, the touch keys, the display screen and the touch screen are connected with the main CPU module; and the sound amplifier is connected with the speaker.

10. The electric guitar of claim 1, wherein the display screen is a LED (light emitting diode) display screen or a LCD (liquid crystal display).

\* \* \* \* \*